United States Patent
Kim

(10) Patent No.: US 11,637,338 B2
(45) Date of Patent: Apr. 25, 2023

(54) BATTERY MODULE ASSEMBLY AND ASSEMBLING METHOD THEREOF

(71) Applicant: HYUNDAI MOBIS Co., Ltd., Seoul (KR)

(72) Inventor: Ki Hyeon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 299 days.

(21) Appl. No.: 16/998,946

(22) Filed: Aug. 20, 2020

(65) Prior Publication Data

US 2021/0057692 A1     Feb. 25, 2021

(30) Foreign Application Priority Data

Aug. 21, 2019  (KR) .................. 10-2019-0102709

(51) Int. Cl.
| | | |
|---|---|---|
| *H01M 10/6555* | (2014.01) | |
| *H01M 10/647* | (2014.01) | |
| *H01M 10/6551* | (2014.01) | |
| *H01M 10/613* | (2014.01) | |
| *H01M 50/244* | (2021.01) | |
| *H01M 50/264* | (2021.01) | |
| *H01M 50/291* | (2021.01) | |
| *H01M 50/211* | (2021.01) | |

(Continued)

(52) U.S. Cl.
CPC ..... *H01M 10/6555* (2015.04); *H01M 10/486* (2013.01); *H01M 10/613* (2015.04); *H01M 10/647* (2015.04); *H01M 10/6551* (2015.04); *H01M 50/211* (2021.01); *H01M 50/242* (2021.01); *H01M 50/244* (2021.01); *H01M 50/264* (2021.01); *H01M 50/291* (2021.01); *H01M 50/293* (2021.01)

(58) Field of Classification Search
None
See application file for complete search history.

(56) References Cited

U.S. PATENT DOCUMENTS

| | | | |
|---|---|---|---|
| 9,147,916 B2 * | 9/2015 | Bronczyk | H01M 50/227 |
| 2010/0273042 A1 * | 10/2010 | Buck | H01M 50/20 |
| | | | 429/120 |

(Continued)

FOREIGN PATENT DOCUMENTS

| | | | | |
|---|---|---|---|---|
| CN | 107369863 A | | 11/2017 | |
| DE | 102013021549 A1 * | 6/2015 | | H01M 10/613 |

(Continued)

OTHER PUBLICATIONS www.espacenet.com machine translation of DE 102013021549A. (Year: 2013).*

(Continued)

*Primary Examiner* — Gregg Cantelmo
(74) *Attorney, Agent, or Firm* — NSIP Law

(57) ABSTRACT

A battery module assembly with a plurality of unit modules stacked therein is provided. Each of the plurality of unit modules includes a cartridge including a cooling plate having a plate shape and two pouch type battery cells mounted on each of both side surfaces of the cooling plate with the cartridge therebetween. A partition having a tetragonal frame shape and including an internal empty space is disposed between adjacent unit modules among the plurality of unit modules.

19 Claims, 18 Drawing Sheets

(51) Int. Cl.
    *H01M 50/242*     (2021.01)
    *H01M 10/48*     (2006.01)
    *H01M 50/293*     (2021.01)

(56) References Cited

U.S. PATENT DOCUMENTS

| | | | |
|---|---|---|---|
| 2011/0183176 A1* | 7/2011 | Schwab | H01M 10/6551 |
| | | | 29/623.2 |
| 2015/0017504 A1* | 1/2015 | Isshiki | B60L 50/16 |
| | | | 429/120 |
| 2017/0047620 A1* | 2/2017 | Lee | H01M 50/20 |

FOREIGN PATENT DOCUMENTS

| | | |
|---|---|---|
| KR | 10-2007-0091387 A | 9/2007 |
| KR | 10-2013-0075256 A | 7/2013 |

OTHER PUBLICATIONS https://www.britannica.com/dictionary/pin pdf website for definition (Year: unknown).*

* cited by examiner

BATTERY MODULE ASSEMBLY AND ASSEMBLING METHOD THEREOF

CROSS-REFERENCE TO RELATED APPLICATIONS

This application claims priority under 35 U.S.C. § 119 to Korean Patent Application No. 10-2019-0102709, filed on Aug. 21, 2019, the disclosure of which is incorporated herein by reference in its entirety.

TECHNICAL FIELD

The present invention relates to a battery module assembly applied to vehicles.

BACKGROUND

FIG. 1 is an exploded perspective view of a related art battery module assembly 100.

Referring to FIG. 1, the related art battery module assembly 100 includes a plurality of pouch type battery cells 200, a cell cover 310 which surrounds whole outer surfaces of a pair of battery cells (two battery cells) or three or more battery cells, and an upper frame member 400 and a lower frame member 500 which are vertically detached from each other and are coupled to each other in an assembly fastening structure.

In FIG. 1, reference numeral 223 refers to an electrode terminal, and reference numerals 600 and 601 refer to bus bars. Descriptions of the other reference numerals are omitted.

The related art battery module assembly 100 has the following problems.

First, in the related art battery module assembly 100, a cell cover 310 is manufactured as a high-strength exterior member including a synthetic resin or a metal material to surround a pair of battery cells (two battery cells) or three or more battery cells, and in this case, there is a problem where the high-strength exterior member should be again manufactured based on a thickness variation of a battery cell.

Second, although not shown in detail, an insert nut structure (an assembly structure) for assembling an upper detachable frame and a lower detachable frame and an insert bolt structure (a mounting structure) for mounting a battery module on an inner portion of a vehicle are needed, a battery module size increases and the number of elements increases.

Third, a lower frame member 500 is manufactured by an injection process, but a limitation of the injection process causes a phenomenon (a rib bending phenomenon) where a vertical partition wall part (rib) configuring the lower frame member 500 is inward contracted like a direction of a dotted arrow illustrated in FIG. 1. Therefore, in order to easily insert the cell cover surrounding the battery cells into the lower frame member 500, a worker should perform a handwork of unfolding a partition wall part with hands several to tens times before working, and due to this, there is a problem where a total assembly time increases.

SUMMARY

Accordingly, the present invention provides a battery module assembly and an assembling method thereof, which enable a battery module to be assembled, solve a problem where a battery module size and the number of elements increase, based on a cartridge, and decrease a total assembly time, regardless of a thickness variation of a battery cell.

In one general aspect, in a battery module assembly with a plurality of unit modules stacked therein, each of the plurality of unit modules includes: a cartridge including a cooling plate having a plate shape; and two pouch type battery cells mounted on each of both side surfaces of the cooling plate with the cartridge therebetween, wherein a partition having a tetragonal frame shape and including an internal empty space is disposed between adjacent unit modules among the plurality of unit modules.

In another general aspect, a method of manufacturing a battery module assembly with a plurality of unit modules stacked therein includes: mounting a battery cell on both side surfaces of a cooling plate having a plate shape with a cartridge, including the cooling plate, therebetween to configure a unit module; stacking another unit module on the unit module with a partition, having a tetragonal frame shape and including an internal empty space, therebetween; and assembling the unit module, the other unit module, and the partition by using a fastening means passing through a guide hole provided in one end portion of each of the unit module, the other unit module, and the partition.

In another general aspect, in a battery module assembly with a plurality of cartridges stacked therein, each of the plurality of cartridges includes: a cooling plate having a plate shape, a pouch type battery cell being attached on each of both side surfaces of the cooling plate; and a frame configuring a border of the cooling plate, wherein the battery module assembly further includes a partition having a tetragonal frame shape and filling an interval between a frame of a cartridge and a frame of another cartridge adjacent to the cartridge.

Other features and aspects will be apparent from the following detailed description, the drawings, and the claims.

DETAILED DESCRIPTION OF EMBODIMENTS

Figure 1:
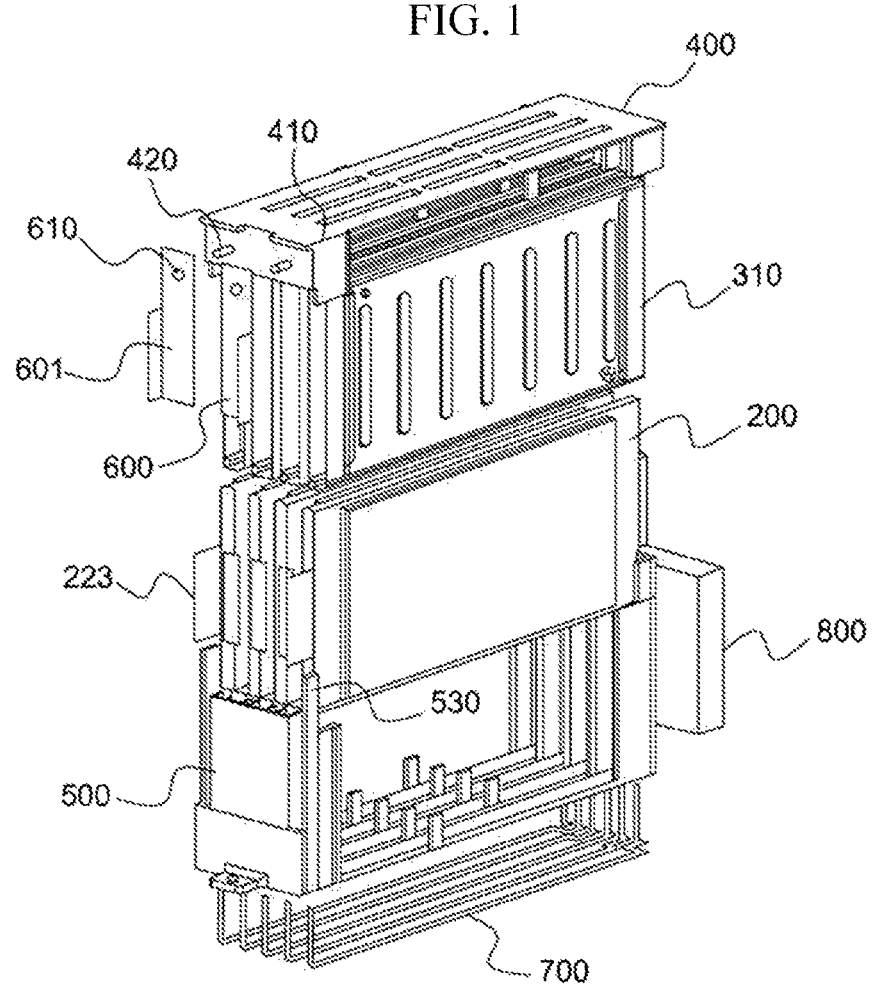
FIG. 1 is an exploded perspective view of a related art battery module assembly.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

The term "unit module" may be used herein, and a unit module will be described below in detail and may be used as a concept including two battery cells disposed at both sides of one cartridge therebetween. The term "unit module" may be referred to as the term "cartridge", and in this case, the term "cartridge" may be construed as a concept including two battery cells.

Moreover, a structural/functional feature between two adjacent unit modules or two adjacent cartridges are described in claims, but this is for clearly representing technical features defined in the claims and the claims are not limited to a battery module assembly configured with only two adjacent unit modules or two adjacent cartridges.

Figure 2:
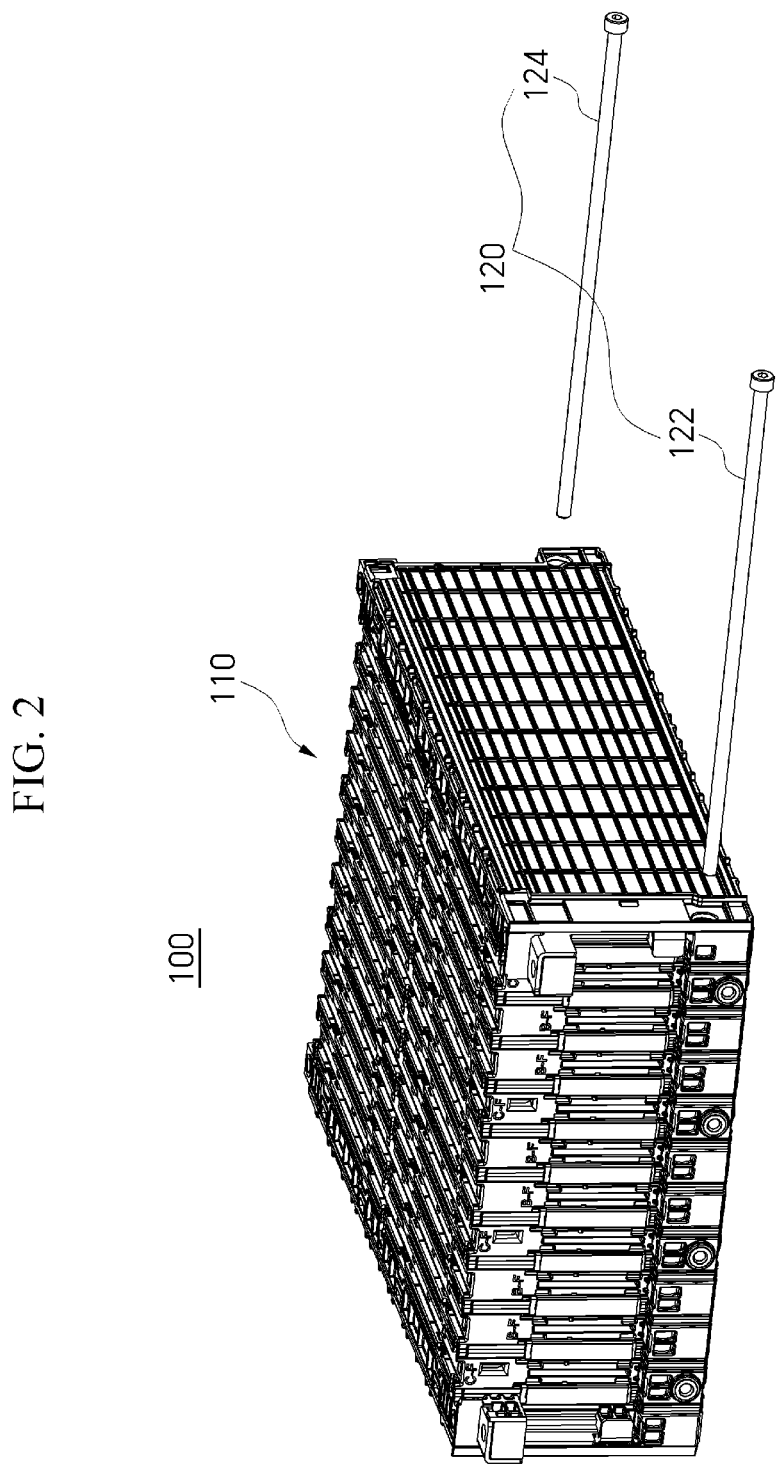
FIG. 2 is a perspective view illustrating a whole outer shape of a battery module assembly according to an embodiment of the present invention.
Figure 3:
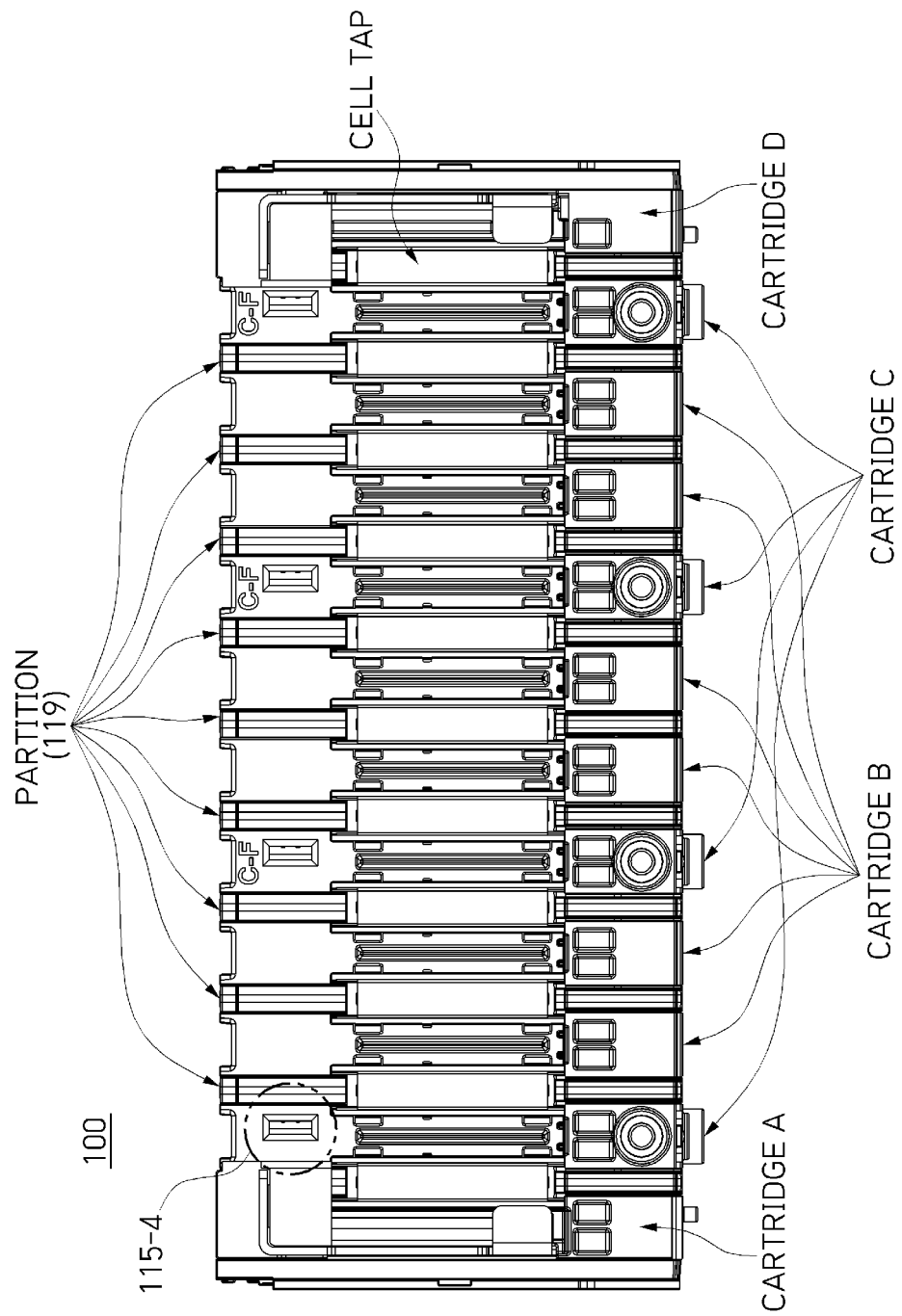
FIG. 3 is a side view of the battery module assembly illustrated in FIG. 2.

FIG. 2 is a perspective view illustrating a whole outer shape of a battery module assembly 100 according to an embodiment of the present invention. FIG. 3 is a side view of the battery module assembly illustrated in FIG. 2.

Referring to FIGS. 2 and 3, the battery module assembly 100 according to an embodiment of the present invention may include a plurality of unit modules 110 which are stacked in a horizontal direction.

The stacked plurality of unit modules 110 may be assembled by a fastening means 120 (122 and 124) such as a long bolt. Here, the fastening means 120 (122 and 124) may include, for example, long bolts.

Two long bolts 122 and 124 may pass through a plurality of guide holes which are formed in one end portion and the other end portion of a cartridge included in each unit module and may fasten the plurality of unit modules 110.

A surface pressure applied to a battery cell may be generated in a fastening (assembling) process and may prevent a swelling phenomenon where the battery cell swells, thereby increasing a lifetime of a battery module.

The battery module assembly 100 according to an embodiment of the present invention, as illustrated in FIG. 3, may further include a plurality of partitions 119 each disposed between two adjacent unit modules of the plurality of unit modules 110.

The partition 119 may compensate for a thickness of a battery cell included in each of the plurality of unit modules 110. That is, the partition 119 may act as a spacer for maintaining an interval between adjacent unit modules (an interval between cartridges).

The partition 119 may be previously manufactured to have various widths. Therefore, a cartridge suitable for a thickness may not be injected whenever a thickness of a battery cell is changed, and an interval between the unit modules may be maintained by using the partition 119 selected from among the plurality of partitions 119 which are previously manufactured to have various widths, whereby a battery module may be configured regardless of the thickness of the battery cell. The partitions 119 will be described below in detail.

Each of the unit modules may include one cartridge, and as illustrated in FIG. 3, cartridges may be classified into cartridges A, B, C, and D on the basis of a design shape.

The cartridges A, B, C, and D may have a slight difference therebetween on the basis of a design shape, but a whole shape thereof may be a rectangular shape. Similarly, the partition 119 may also be implemented in a rectangular shape.

The cartridges A, B, C, and D will be described below. There may be a difference between outer shapes in that an inner portion of each of the cartridges A, B, C, and D is plugged by a plate-shaped cooling plate and the partition 119 is implemented in a tetragonal frame shape where an inner portion thereof is empty.

FIG. 3 illustrates a structure where the cartridge A is disposed at a left outermost portion, the cartridge D is disposed at a right outermost portion, and the cartridges B and C are alternately stacked therebetween.

Moreover, a structure is illustrated where two cartridges B are stacked between two adjacent cartridges C, but the present invention is not limited thereto. In other embodiments, the cartridges B and C except the cartridges A and D may be configured so that the number and arrangement of cartridges are changed based on a configuration of a battery module, a mounting structure and a configuration of a battery module may be differently implemented.

Hereinafter, a structure of a unit module will be described in detail.

Figure 4:
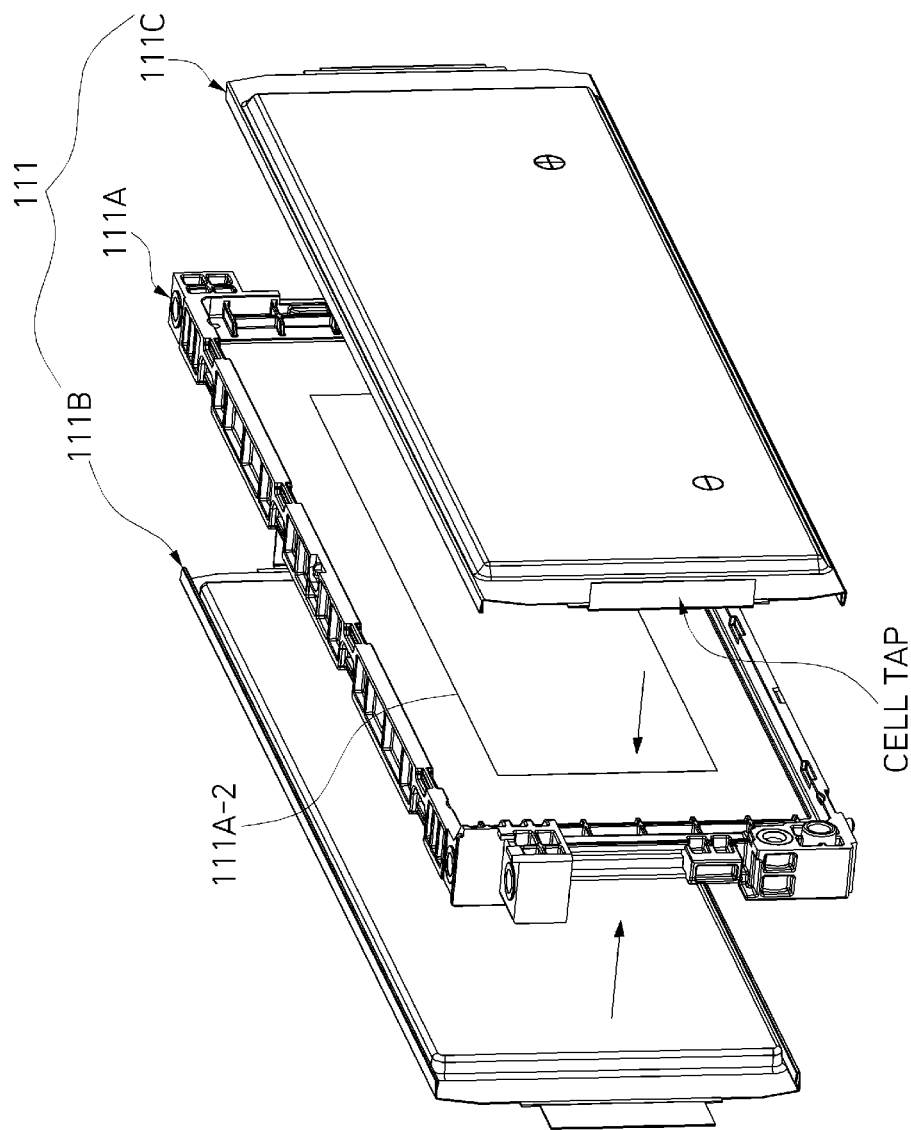
FIG. 4 is an exploded perspective view of a unit module including a cartridge A illustrated in FIG. 3.
Figure 5:
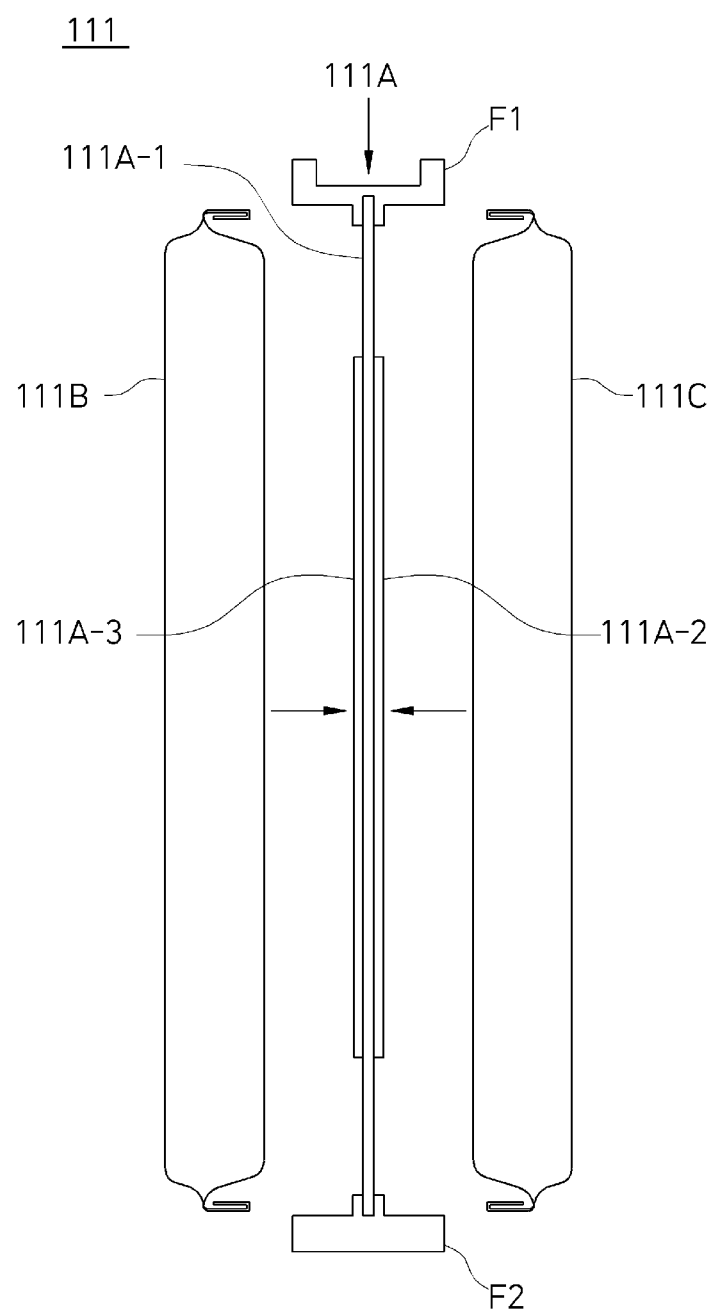
FIG. 5 is a vertical cross-sectional view of a unit module illustrated in FIG. 4.
Figure 6:
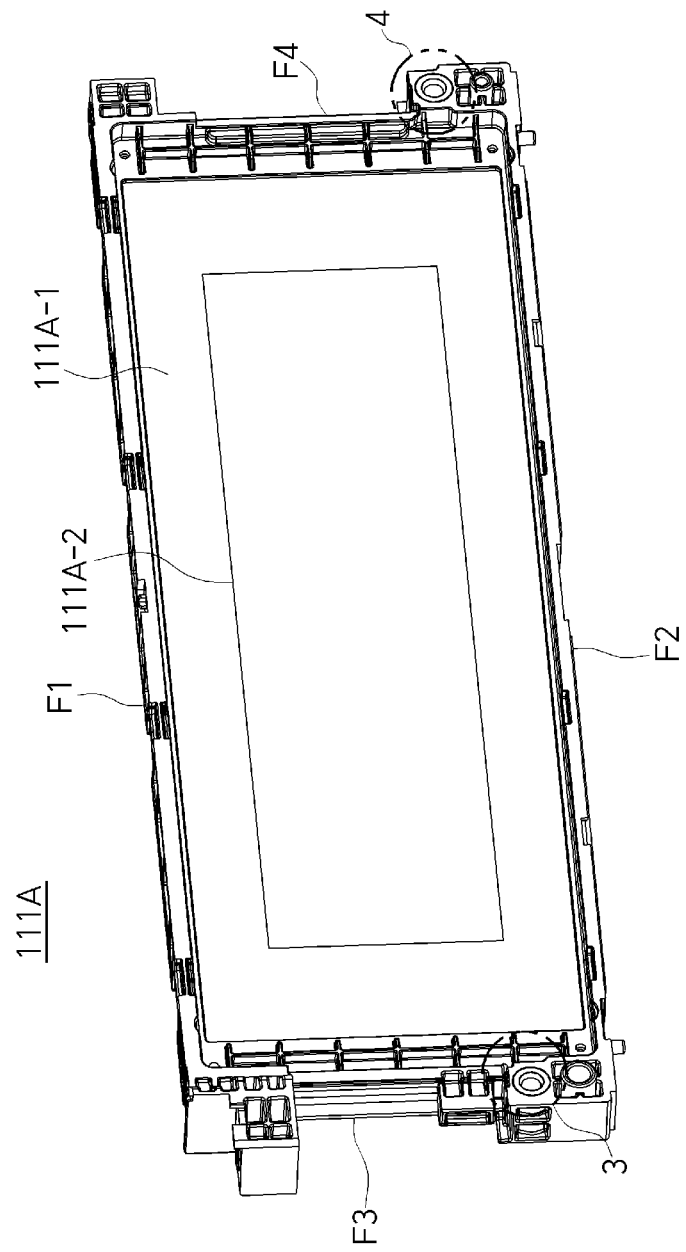
FIG. 6 is a perspective view of the cartridge A illustrated in FIGS. 4 and 5.
Figure 7:
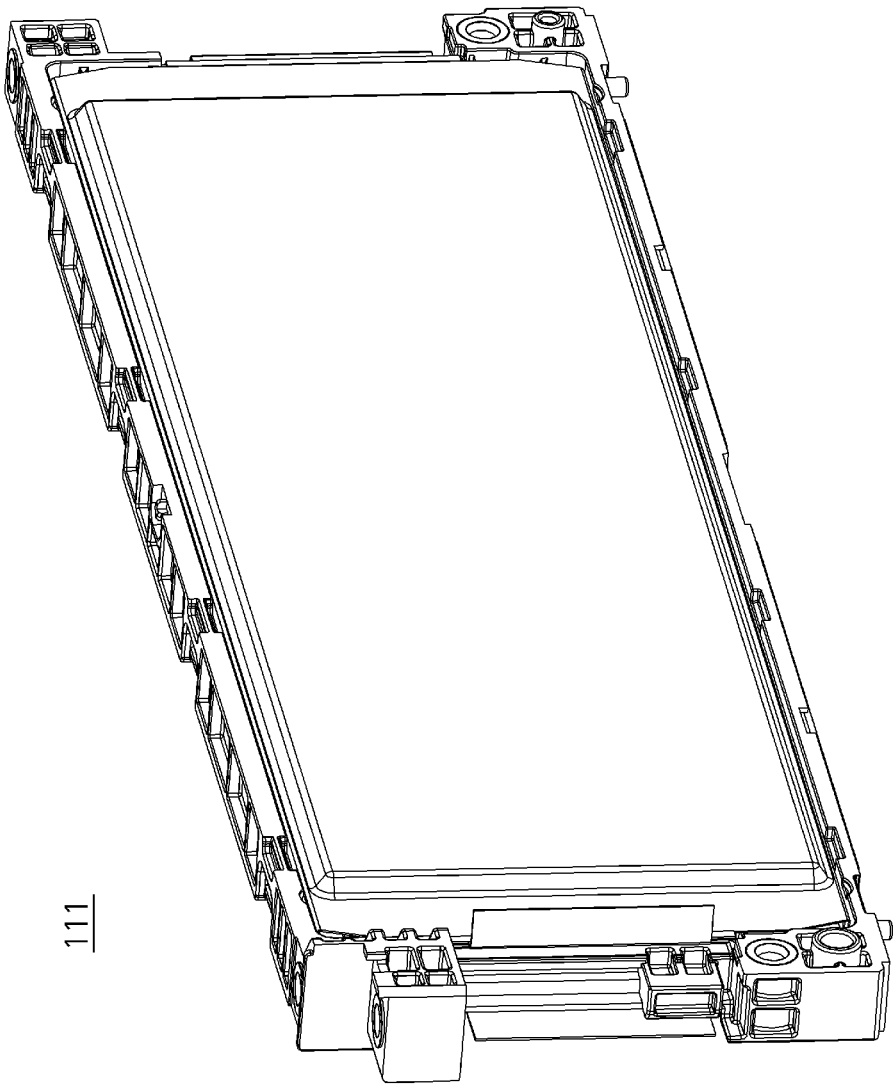
FIG. 7 is a perspective view illustrating a state where a unit module disassembled in FIG. 4 is assembled.
Figure 8:
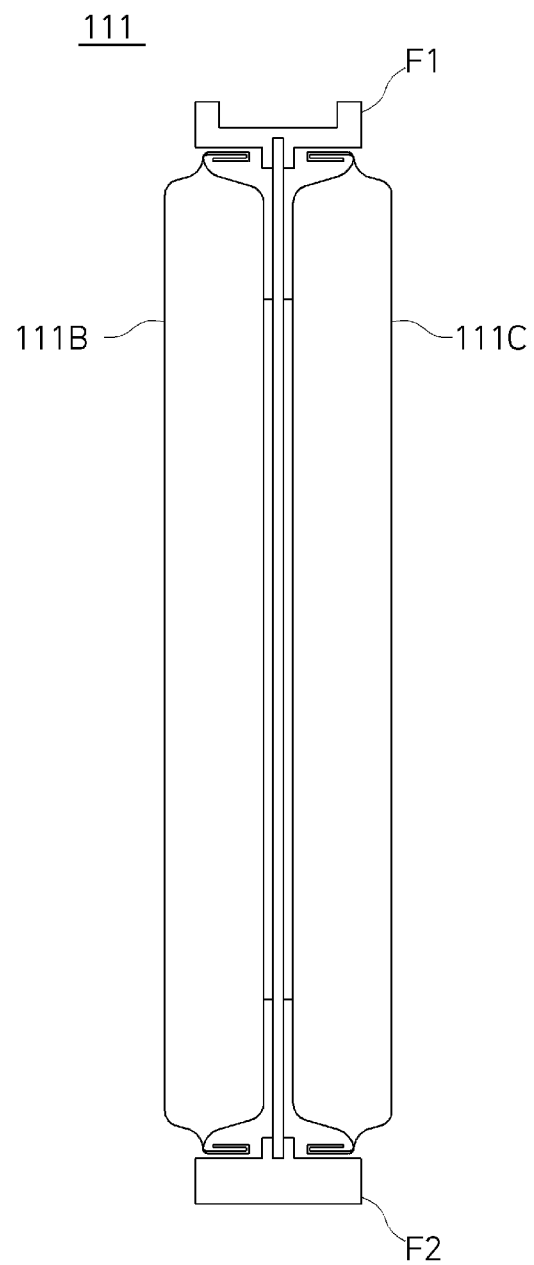
FIG. 8 is a vertical cross-sectional view of a unit module illustrated in FIG. 7.

FIG. 4 is an exploded perspective view of a unit module including a cartridge A illustrated in FIG. 3. FIG. 5 is a vertical cross-sectional view of a unit module illustrated in FIG. 4. FIG. 6 is a perspective view of the cartridge A illustrated in FIGS. 4 and 5. FIG. 7 is a perspective view illustrating a state where a unit module disassembled in FIG. 4 is assembled. FIG. 8 is a vertical cross-sectional view of a unit module illustrated in FIG. 7.

As illustrated in FIGS. 4 and 5, a unit module 111 may be configured in a structure which includes two battery cells 111B and 111C fixed to and mounted on both side surfaces of a cartridge A 111A.

As illustrated in FIG. 6, the cartridge A 111A may include a plate-shaped cooling plate 111A-1 and a plurality of frames F1 to F4 forming a border of the cooling plate 111A-1.

The cooling plate 111A-1 may be provided in a rectangular plate shape and may function as a heat dissipation plate for the battery cells 111B and 111C.

A plurality of adhesive means (111A-2 and 111A-3 of FIG. 5) may be attached on both side surfaces of the cooling plate 111A-1, and two battery cells 111B and 111C may be fixed to both side surfaces of the cooling plate 111A-1 by the adhesive means (111A-2 and 111A-3 of FIG. 5). The adhesive means 111A-2 and 111A-3 may each include, for example, a transparent double-sided tape.

As illustrated in FIG. 6, the frames F1 to F4 may include the frames F1 and F2 forming a long side and the frames F3 and F4 forming a short side.

A guide-hole plate structure 3 through which a long bolt (122 of FIG. 1) passes may be provided at one end portion of the frame F3 configuring a short side. Also, a guide-hole plate structure 4 through which a long bolt (124 of FIG. 1) passes may be provided at one end portion of the frame F4.

A shape and a structure of the cartridge A disposed at the left outermost portion illustrated in FIG. 3 may be substantially the same as those of the cartridge D disposed at the right outermost portion of FIG. 3. Therefore, the description of the structure of the unit module including the cartridge A described above with reference to FIGS. 4 to 8 may be applied to a structure of a unit module including the cartridge D.

The cartridge A and the cartridges B and C illustrated in FIG. 3 may have a slight difference in design shape, but a unit module including the cartridge B or a unit module including the cartridge C may have a structure which is similar to that of the unit module including the cartridge A illustrated in FIGS. 4 to 8.

Figure 9:
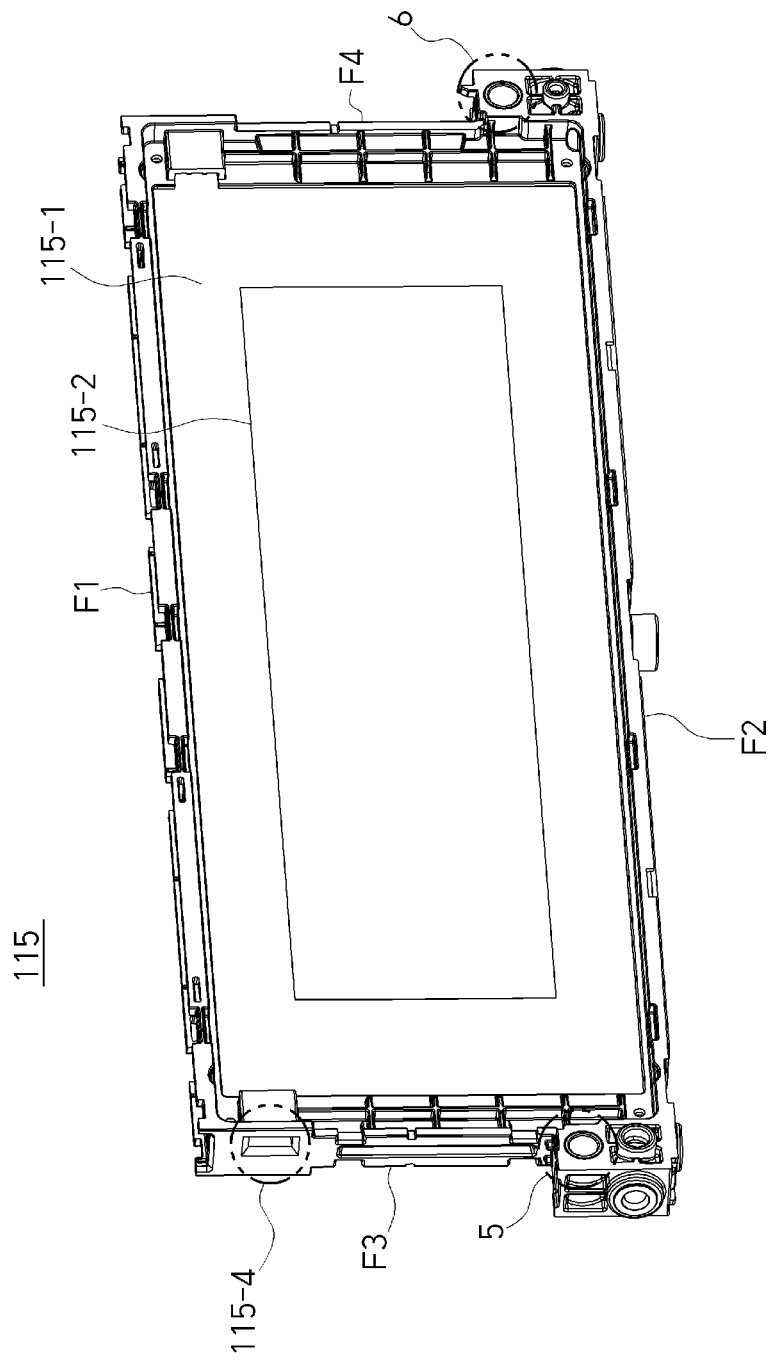
FIG. 9 is a perspective view of a cartridge C illustrated in FIG. 3.

For example, FIG. 9 illustrates a whole outer shape of the cartridge C. As illustrated in FIG. 9, similarly to the cartridge A, the cartridge C 115 may include a plate-shaped cooling plate 115-1 and a plurality of frames F1 to F4 configuring a border of the cooling plate 115-1. An adhesive means 115-2 such as a transparent double-sided tape may be attached on both side surfaces of the cooling plate 115-1, and two battery cells may be fixed to both side surfaces of the cooling plate 115-1 by a plurality of adhesive means 111A-2 and 111A-3 and may configure a unit module.

A shape and a structure of the cartridge B may be very similar to those of the cartridge C, and thus, the description of the unit module including the cartridge C may be applied to a unit module including the cartridge B.

Figure 10:
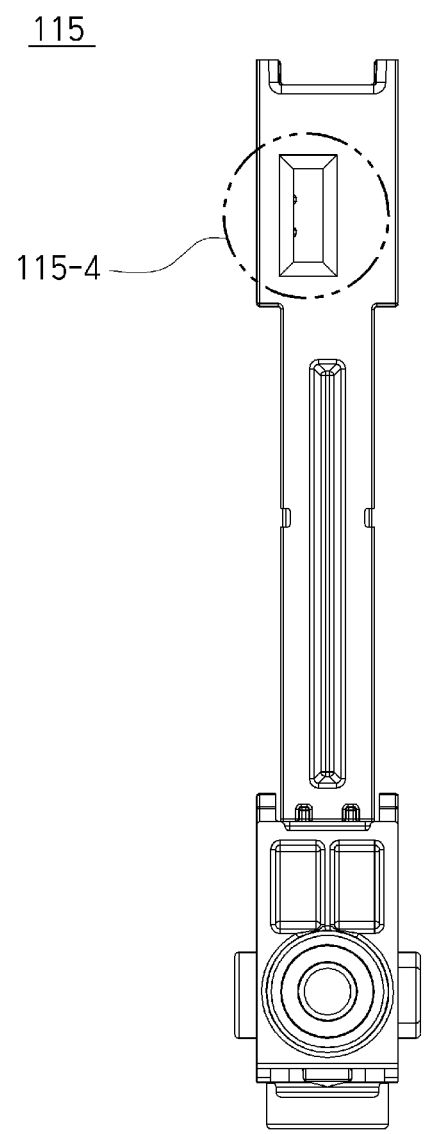
FIG. 10 is a side view of a cartridge C illustrated in FIG. 9.

Unlike the cartridge B, the cartridge C may have a difference in that the cartridge C further includes an insertion hole 115-4 into which a temperature sensor for sensing a temperature of the cooling plate 115-1 is inserted. For example, as illustrated in FIG. 10, the insertion hole 115-4 with the temperature sensor inserted thereinto may be provided in the frame F3 configuring a short side in the cartridge C 115. The insertion hole 115-4 into which a temperature sensor contactable with a cooling plate 115-1 of the cartridge C is inserted may be provided, and thus, a temperature sensor of a module may be applied.

The number and arrangement (stacked order) of cartridges B may differ from the number and arrangement (stacked order) of cartridges C, based on a configuration of a module. Therefore, by differently changing the number and arrangement of cartridges C on which a temperature sensor is capable of being mounted, the number of position of temperature sensors capable of being applied to a module may be freely adjusted.

Moreover, as illustrated in FIG. 9, a guide hole (5 of FIG. 9) through which the long bolt 122 illustrated in FIG. 2 passes may be further provided in the frame F3 configuring a short side of the cartridge C 115, in addition to the insertion hole 115-4, and a guide hole (6 of FIG. 9) may be further provided in the frame F4 facing the frame F3 of the cartridge C 115.

Similarly, although not shown, a guide hole through which the long bolt 122 passes may be provided in one end portion of each of frames configuring short sides in the cartridge B.

Figure 11:
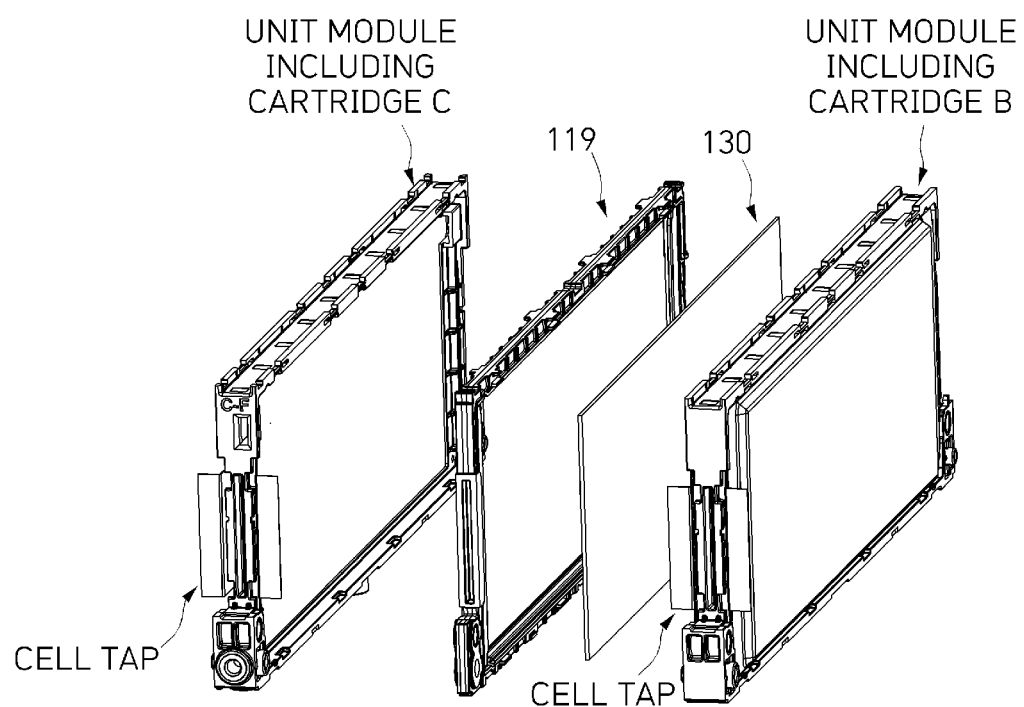
FIG. 11 is an exploded perspective view of a stacked element where two unit modules are stacked with a partition therebetween, according to an embodiment of the present invention.

FIG. 11 is an exploded perspective view of a stacked element where two unit modules are stacked with a partition therebetween, according to an embodiment of the present invention.

A partition disposed between the cartridge C and the cartridge B is illustrated in FIG. 11, but is not limited thereto and a partition may be disposed between the cartridges A and B, between the cartridge C and another cartridge C, and between the cartridges C and D on the basis of the same structure as a structure illustrated in FIG. 11.

The partition 119 may have a tetragonal frame shape where an inner portion thereof is empty and may compensate for a thickness of a battery cell included in each unit module. Also, the partition 119 may define a space where a surface pressure member 130 is disposed between (between battery cells) a unit module including the cartridge C and a unit module including the cartridge B.

Figure 12:
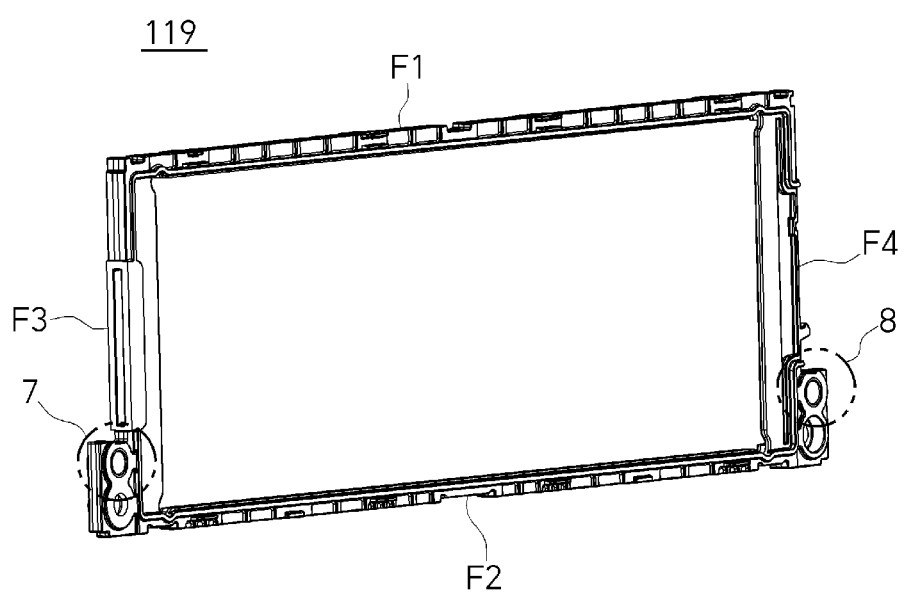
FIG. 12 is a perspective view illustrating a whole outer shape of the partition illustrated in FIG. 11.

FIG. 12 is a perspective view illustrating a whole outer shape of the partition illustrated in FIG. 11.

Referring to FIG. 12, a partition 119 may be implemented in a tetragonal frame shape where an inner portion thereof is empty, and in order to configure a tetragonal frame shape, the partition 119 may include frames F1 and F2 forming a long side and frames F3 and F4 forming a short side.

A guide-hole plate structure 7 through which a long bolt (122 of FIG. 1) passes may be provided at one end portion of the frame F3, and moreover, a guide-hole plate structure 8 through which a long bolt (124 of FIG. 1) passes may be provided at one end portion of the frame F4 facing the frame F3.

Figure 13:
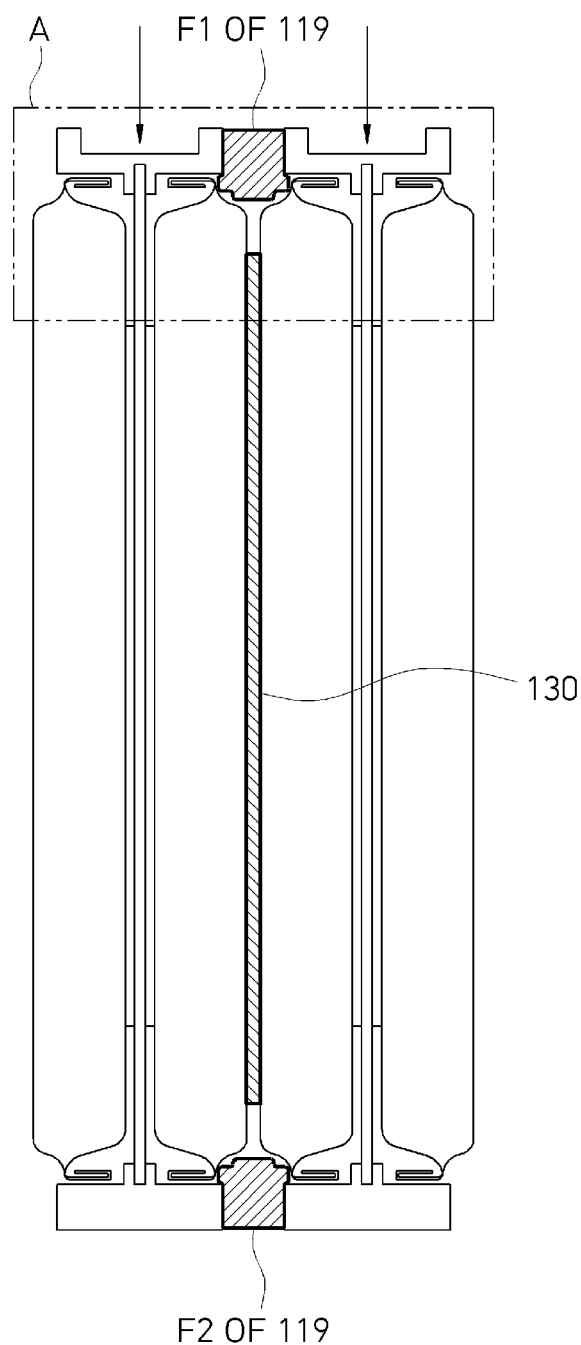
FIG. 13 is a vertical cross-sectional view illustrating a state where two adjacent unit modules are stacked with a partition therebetween, according to an embodiment of the present invention.
Figure 14:
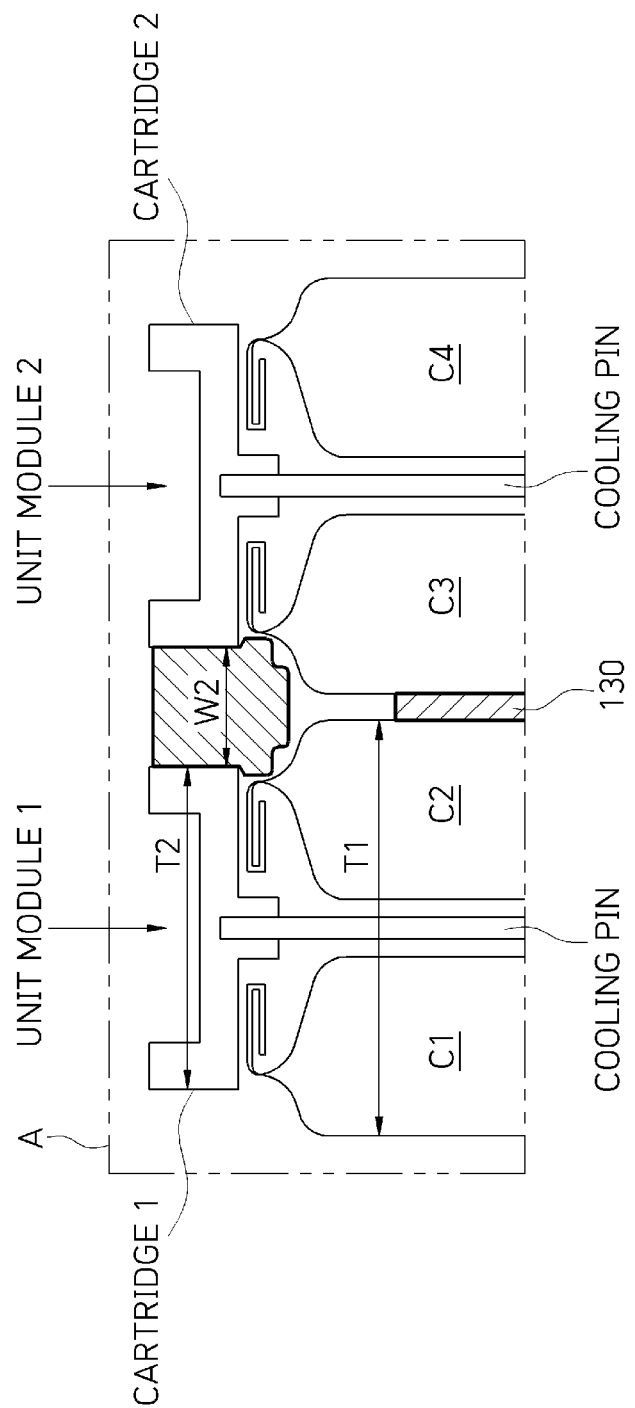
FIG. 14 is an enlarged view of a region A illustrated in FIG. 12.

FIG. 13 is a vertical cross-sectional view illustrating a state where two adjacent unit modules are stacked with a partition therebetween, according to an embodiment of the present invention, and FIG. 14 is an enlarged view of a region A illustrated in FIG. 12.

Referring to FIGS. 13 and 14, a cartridge 1 of a unit module 1 and a cartridge 2 of a unit module 2, which are disposed at both sides with the partition 119 therebetween, may be the same cartridges or different kinds of cartridges.

A width W (or a width of a frame) of the partition 119 may be variously manufactured to compensate for a thickness variation of a battery cell included in each unit module. That is, a plurality of partitions 119 having various widths may be previously manufactured, and then, the partition 119 having the width W for compensating for a thickness of a battery cell may be selected whenever a thickness of a battery cell varies.

As illustrated in FIG. 14, when a total thickness T1 of two battery cells C1 and C2 mounted at both sides of a cartridge is thicker than a width T2 of the cartridge, an interval between the cartridge 1 and the cartridge 2 may occur due to a difference between the total thickness T1 of the battery cells and the width T2 of the cartridge 1.

In order to compensate for such an interval, the partition 119 may be disposed between the cartridge 1 and the cartridge 2 (between adjacent unit modules). In this case, the partition 119 having the width W corresponding to the interval between the cartridges 1 and 2 may be selected from among a plurality of partitions previously manufactured to have various widths, and the selected partition 119 may fill the interval between the cartridges 1 and 2. Accordingly, a battery module may be configured regardless of a thickness of a battery cell.

The internal space of the partition 119 may define a space where a surface pressure pad 130 is disposed. As illustrated in FIG. 14, in terms of a unit module, the surface pressure pad 130 may be disposed between adjacent unit modules 1 and 2, but in terms of a battery cell, the surface pressure pad 130 may be disposed between battery cells C2 and C3 facing each other.

Because the surface pressure pad 130 are disposed between adjacent unit modules (or between battery cells C2 and C3), the surface pressure pad 130 may prevent a swelling phenomenon where a battery cell swells, thereby increasing a lifetime of a battery module.

The surface pressure pad 130 may include a material has elasticity, for preventing a battery cell from being damaged by an excessive surface pressure, and for example, may include a plastic material.

Figure 15:
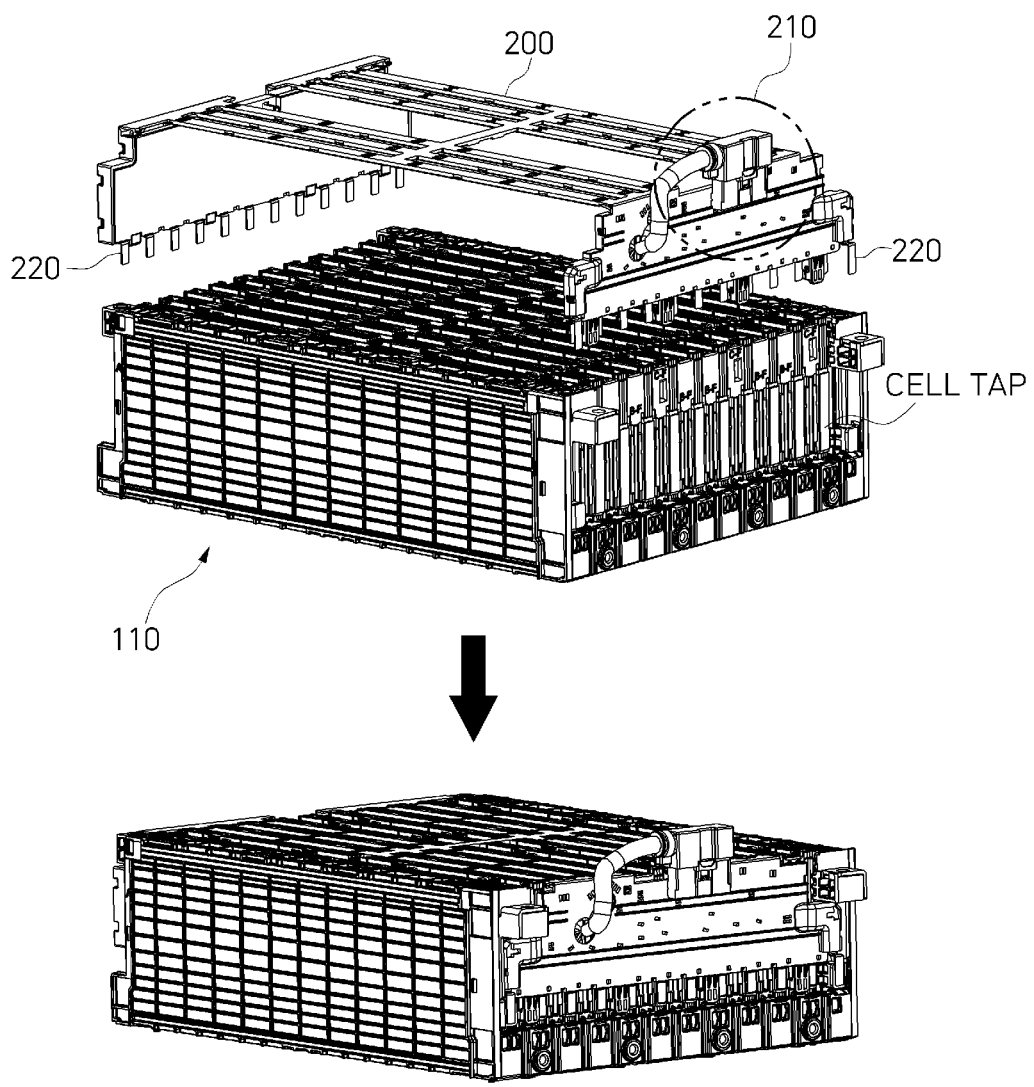
FIGS. 15 to 17 are diagrams illustrating an assembling process of a final battery module assembly after a plurality of unit modules illustrated in FIG. 2 are fastened by using long bolts.
Figure 16:
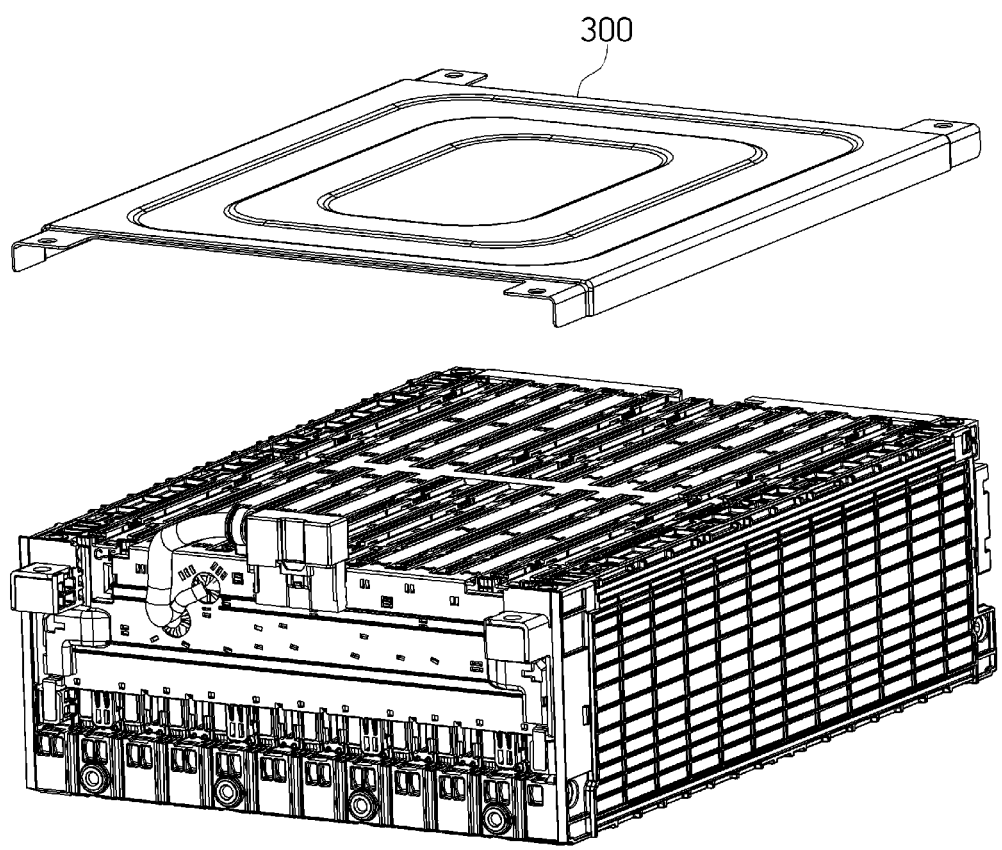
Figure 17:
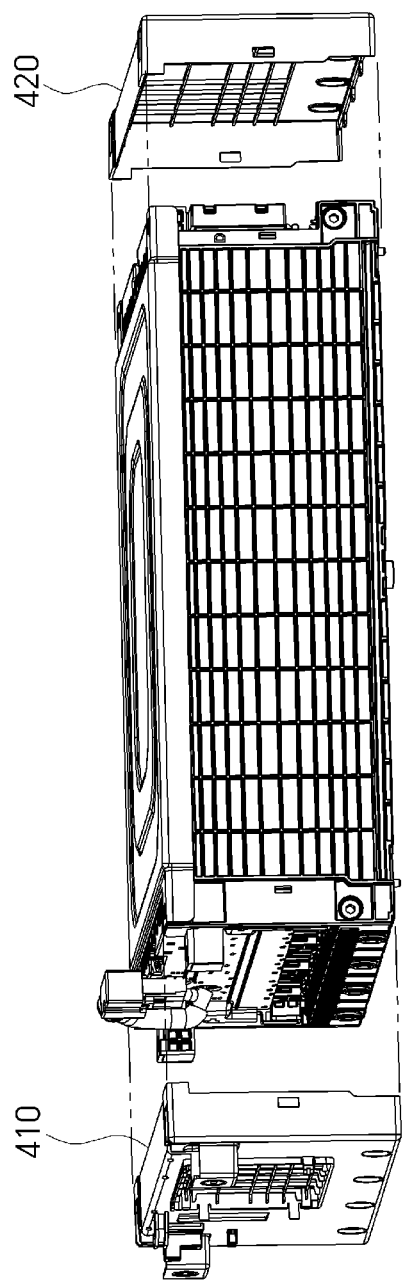

FIGS. 15 to 17 are diagrams illustrating an assembling process of a final battery module assembly after a plurality of unit modules illustrated in FIG. 2 are fastened by using long bolts.

First, referring to FIG. 15, when an assembling process of a plurality of unit modules is completed by using long bolts, a sensing assembly, into which a connector 210 for transferring a voltage measurement value of each of a cell tap, a wire, and an element for detecting voltages of battery cells is embedded, may be assembled on an assembly 110 including a plurality of unit modules fastened to one another by long bolts (122 and 124 of FIG. 2).

The sensing assembly 200, as illustrated in FIG. 15, may be manufactured as a type where both end portions thereof are bent in a ¬-shape through an injection process, and a plurality of terminals 220 may be provided at an end portion of a bent portion and may be welded to a cell tap (a bus bar) exposed at a side surface of the assembly 110 of a plurality of unit modules to contact the cell tap.

Referring to FIG. 16, when assembling of the sensing assembly 200 is completed on the assembly 110, an upper case 300 covering an upper portion of the sensing assembly 200 may be assembled.

Referring to FIG. 17, when assembling of the upper case 300 is completed, a plurality of covers 410 and 420 may be assembled at both side surfaces of an assembly where assembling of the upper case 300 is completed, for protecting a cell tap exposed at both sides of a module, thereby securing the stability of a module.

Figure 18:
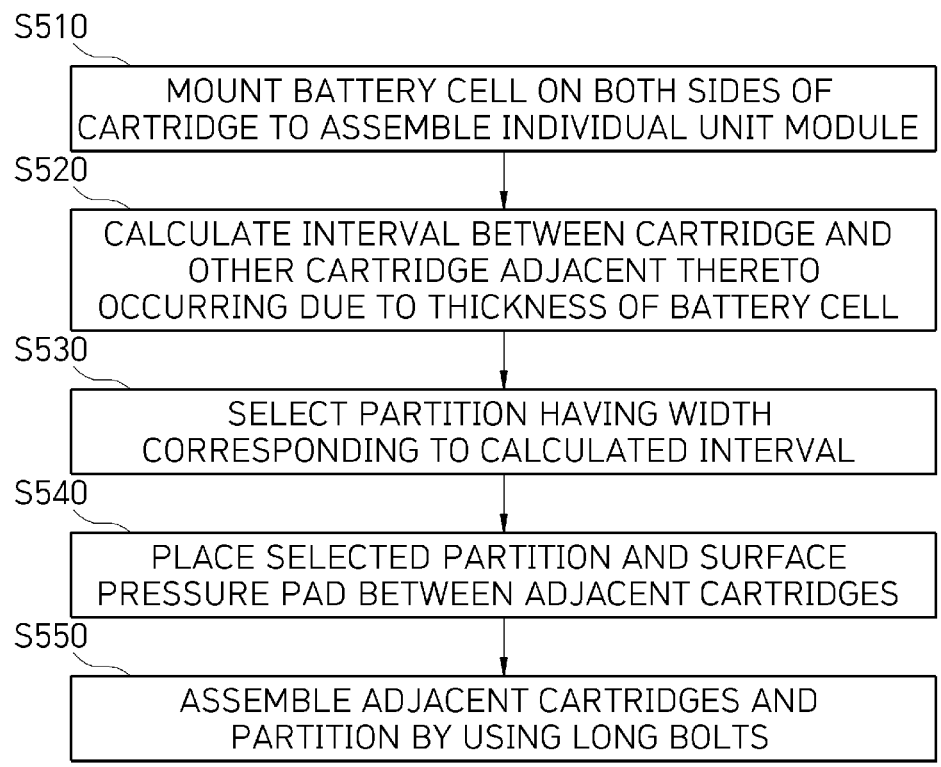
FIG. 18 is a flowchart illustrating an assembling process of a battery module assembly according to an embodiment of the present invention.

FIG. 18 is a flowchart illustrating an assembling process of a battery module assembly according to an embodiment of the present invention.

Referring to FIG. 18, a process of mounting a battery cell on both sides of a cartridge to assemble an individual unit module may be performed in step S510. In detail, the battery cell may be attached on both side surfaces of the cooling plate (111A-11 of FIGS. 2 and 115-1 of FIG. 9) with the cartridge, including the cooling plate (111A-11 of FIGS. 2 and 115-1 of FIG. 9) having a plate shape, therebetween by using double-sided tapes 111A-2, 111A-3, and 115-2, and thus, the individual unit module may be assembled.

Subsequently, a process of calculating an interval between a cartridge (the cartridge 1 of FIG. 14) and another cartridge (the cartridge 2 of FIG. 14) adjacent thereto occurring due to a thickness of a battery cell (T1 of FIG. 13) may be performed in step S520. In this case, when the thickness of the battery cell (T1 of FIG. 13) is not greater than a width of cartridge (the cartridge 1 of FIG. 14), a partition may be omitted in a process of assembling a battery module.

Subsequently, a process of selecting a partition having a width (W of FIG. 14) corresponding to the calculated interval from among a plurality of partitions previously manufactured (injected) to have various widths may be performed in step S530.

Subsequently, a process of placing the selected partition (119 of FIGS. 11 to 14) and a surface pressure pad (130 of FIGS. 11, 13, and 14) between adjacent cartridges (adjacent unit modules) may be performed in step S540.

Subsequently, a process of assembling the adjacent cartridges and the partition disposed therebetween by using long bolts (120 of FIG. 2) may be performed in step S550. A guide hole may be provided in one end portion of each of the cartridge, another cartridge adjacent to the cartridge, and the partitions disposed therebetween, and the cartridge, the other cartridge adjacent to the cartridge, and the partitions disposed therebetween may be assembled by using long bolts passing through the guide holes.

In an assembly where assembling based on a long bolt is completed, as illustrated in FIGS. 15 to 17, assembling of a final battery module assembly may be completed by sequentially assembling a sensing assembly (200 of FIG. 15), an upper case (300 of FIG. 16), and a plurality of side covers (410 and 420 of FIG. 17).

As described above, unlike the related art, according to the embodiments of the present invention, instead of configuring a unit module by using a cell cover surrounding all of battery cells, a unit module may be configured by mounting battery cells on both sides of a cartridge, thereby solving inconvenience where a cell cover should be again manufactured whenever a thickness of each battery cell is changed.

Moreover, an interval between cartridges occurring due to a thickness variation of each battery cell may be simply compensated for by using a partition having a simple structure, and thus, convenience in assembling of a module may be considerably enhanced.

Moreover, a surface pressure pad may be disposed between a battery cell included in a unit module and another battery cell included in another unit module adjacent thereto by using an internal empty space of a partition, and thus, the surface pressure pad may transfer a surface pressure, generated in a fastening process, to a battery cell, thereby preventing a swelling phenomenon of a battery cell to increase a lifetime in use.

In the battery module assembly according to the embodiments of the present invention, a unit module may include one cartridge and two battery cells assembled with the one cartridge therebetween, and a plurality of unit modules may be assembled in a horizontal direction, thereby removing a cell cover (310 of FIG. 1) surrounding a whole outer surface of each of a pair of battery cells (or three or more battery cells) configuring a unit module in the related art battery module assembly. Accordingly, in the embodiments of the present invention, a problem where a high-strength exterior member such as a cell cover should be again manufactured based on a thickness variation of a battery cell may be solved.

Moreover, in the battery module assembly according to the embodiments of the present invention, two battery cells configuring a unit module may be fixed to both surfaces of a cooling plate included in one cartridge disposed between the two battery cells by using an adhesive means such as a double-sided tape, and thus, a unit module may be configured by a very simple method even without a cell cover configuring a unit module in the related art battery module assembly.

Moreover, according to the embodiments of the present invention, because a unit module is configured by a simple method, convenience for assembling a plurality of unit modules may be provided.

Moreover, according to the embodiments of the present invention, a cooling plate included in one cartridge disposed between two battery cells may cool the two battery cells, thereby increasing the thermal conductivity of a battery module.

Moreover, in the battery module assembly according to the embodiments of the present invention, a surface pressure pad may be disposed between adjacent unit modules, and a plurality of unit modules may be fastened by using a fastening means such as a long bolt passing through a guide hole which is formed in one stepped portion of a cartridge included in each unit module, and a surface pressure generated in a fastening process may be transferred to a battery cell through the surface pressure pad, thereby increasing a lifetime of the battery cell.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A battery module assembly, comprising:
   a plurality of unit modules stacked therein, each of the plurality of unit modules comprising:
     a cartridge including a cooling plate having a plate shape; and
     one pouch type battery cell mounted on one side and another pouch type battery cell mounted on another side of the cooling plate with the cartridge therebetween;
   a partition having a tetragonal frame shape and including an internal empty space; and
   a surface pressure pad disposed in the internal empty space of the partition,
   wherein the partition and the surface pressure pad are disposed between adjacent unit modules among the plurality of unit modules.

2. The battery module assembly of claim 1, wherein the two pouch type battery cells are fixed to and attached on both side surfaces of the cooling plate by a double-sided tape.

3. The battery module assembly of claim 1, wherein:
   the partition is disposed between a cartridge included in a unit module and another cartridge included in another unit module adjacent to the unit module, and
   the partition has a width for compensating for an interval between the cartridge and the another cartridge occurring due to a difference between a total thickness of the two pouch type battery cells and the cartridge.

4. The battery module assembly of claim 1, wherein the surface pressure pad comprises a plastic material and is configured to prevent a swelling phenomenon of battery cells disposed between adjacent unit modules among the plurality of unit modules.

5. The battery module assembly of claim 4, wherein the surface pressure pad is disposed between the battery cell and the another battery cell through the internal empty space of the partition.

6. The battery module assembly of claim 4, wherein the surface pressure pad transfers a surface pressure, generated in a process of fastening the plurality of unit modules, to a battery cell to prevent the swelling phenomenon of the battery cell.

7. The battery module assembly of claim 4, wherein the surface pressure pad comprises a material having elasticity.

8. The battery module assembly of claim 1, wherein, by using a fastening means passing through a guide hole provided in one end portion of a cartridge included in the unit module, a guide hole provided in one end portion of the partition, and a guide hole provided in one end portion of another cartridge included in another unit module adjacent to the unit module, the cartridge, the partition, and the another cartridge are assembled.

9. The battery module assembly of claim 1, wherein a cartridge included in some of the plurality of unit modules comprises an insertion hole into which a temperature sensor for sensing a temperature of a cooling plate is inserted.

10. A method of manufacturing a battery module assembly with a plurality of unit modules stacked therein, the method comprising:
    mounting one battery cell on one side surface and mounting another battery cell on another side surface of a cooling plate having a plate shape with a cartridge, and including the cooling plate therebetween to configure a unit module;
    stacking another unit module on the unit module with a partition, having a tetragonal frame shape and including an internal empty space, therebetween;
    placing a surface pressure pad in the internal empty space of the partition; and
    assembling the unit module, the another unit module, and the partition by using a fastening means passing through a guide hole provided in one end portion of each of the unit module, the another unit module, and the partition,
    wherein the partition and the surface pressure pad are disposed between the unit module and the another unit module.

11. The method of claim 10, wherein the configuring of the unit module comprises:
    fixing and attaching the one battery cell on the one side surface and the another battery cell on the another side surface of the cooling plate by using a double-sided tape.

12. The method of claim 10, wherein the stacking of the another unit module on the unit module comprises:
    stacking the battery cell, the surface pressure pad, and the another battery cell through the internal empty space of the partition,
    wherein the surface pressure pad comprises a plastic material and is configured to prevent a swelling phenomenon of the batter cell included in the unit module and the another battery cell included in the another unit module.

13. The method of claim 10, wherein the assembling of the unit module and the another unit module comprises assembling the unit module, the another unit module, and the partition by using a long bolt passing through the guide hole.

14. The method of claim 10, further comprising:
    inserting a temperature sensor contacting the cooling plate into an insertion hole provided in the cartridge included in one of the unit module and the another unit module.

15. A battery module assembly, comprising:
    a plurality of cartridges stacked therein, each of the plurality of cartridges comprising:

a cooling plate having a plate shape, one pouch type battery cell being attached on one side surface and another pouch type battery cell being attached on another side surface of the cooling plate; and a frame configuring a border of the cooling plate; and a partition having a tetragonal frame shape, including an internal empty space, and filling an interval between a frame of a cartridge and a frame of another cartridge adjacent to the cartridge; and a surface pressure pad disposed in the internal empty space of the partition, wherein the partition and the surface pressure pad are disposed between adjacent cartridges among the plurality of cartridges.

16. The battery module assembly of claim 15, further comprising a surface pressure pad, wherein the surface pressure pad comprises a plastic material and is configured to prevent a swelling phenomenon of the pouch type battery cell attached on the one side surface of the cooling plate of the cartridge and the pouch type battery cell attached on the one side surface of the cooling plate of the another module.

17. The battery module assembly of claim 15, wherein the one pouch type battery cell is fixed to and attached on the one side surface and the another pouch type battery cell is fixed to and attached on the another side surface of the cooling plate by a double-sided tape.

18. The battery module assembly of claim 15, wherein the frame comprises an insertion hole into which a temperature sensor for sensing a temperature of a cooling plate is inserted.

19. The battery module assembly of claim 15, further comprising:

a guide hole provided in one end portion of each of a frame of the cartridge, the partition, and a frame of the another cartridge, and a long bolt passing through the guide hole, and wherein the frame of the cartridge, the partition, and the frame of the another cartridge are assembled by the long bolt passing through the guide hole.

* * * * *